March 17, 1970   J. J. KUPKA   3,500,900
THAWING OR REDUCING VISCOSITY OF FROZEN OR CONGEALED
CONTENTS OF RAILWAY CARS OR OTHER CONVEYANCES
Filed May 7, 1968   5 Sheets-Sheet 1
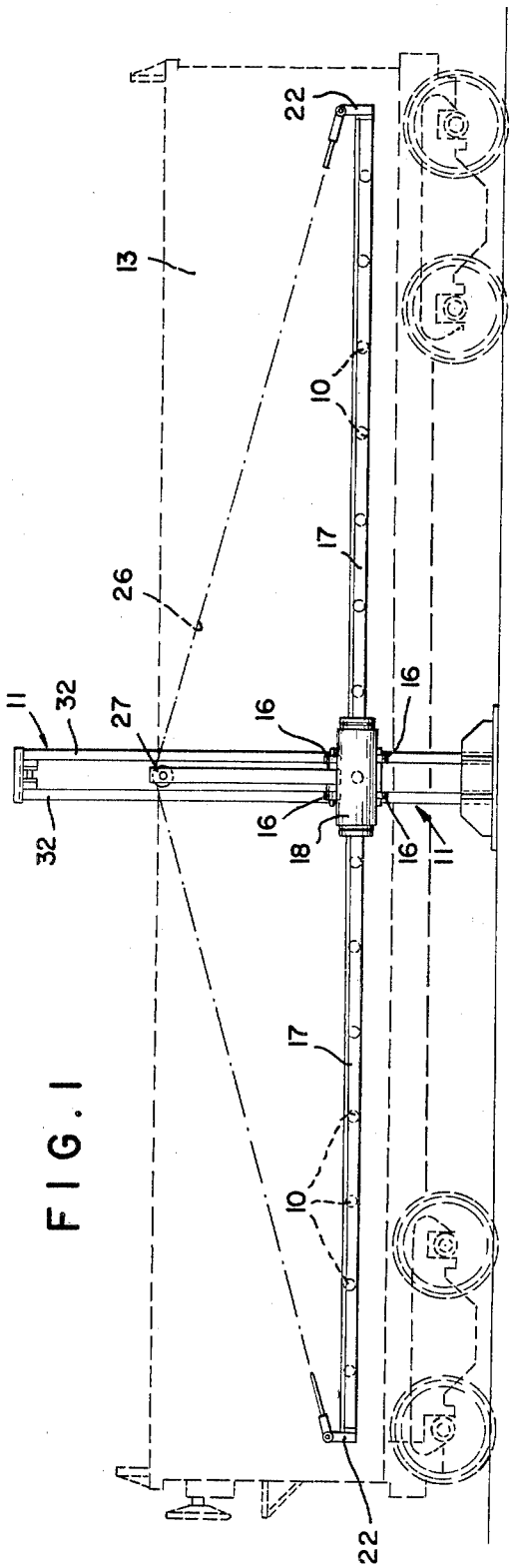
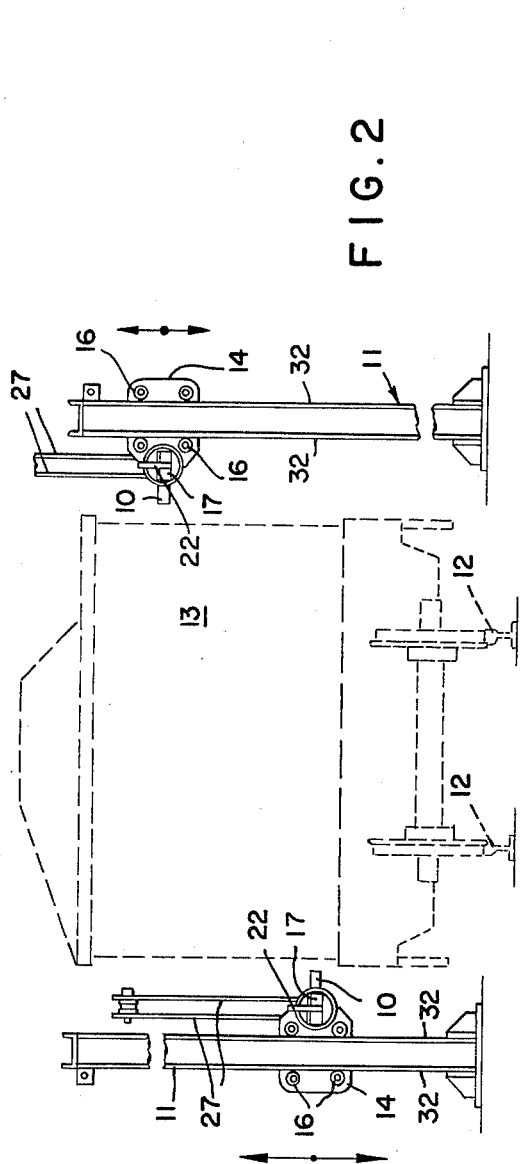
INVENTOR.
JOHN J. KUPKA
BY
Philip S. McGean
ATTORNEY March 17, 1970 J. J. KUPKA 3,500,900
THAWING OR REDUCING VISCOSITY OF FROZEN OR CONGEALED
CONTENTS OF RAILWAY CARS OR OTHER CONVEYANCES
Filed May 7, 1968 5 Sheets-Sheet 2
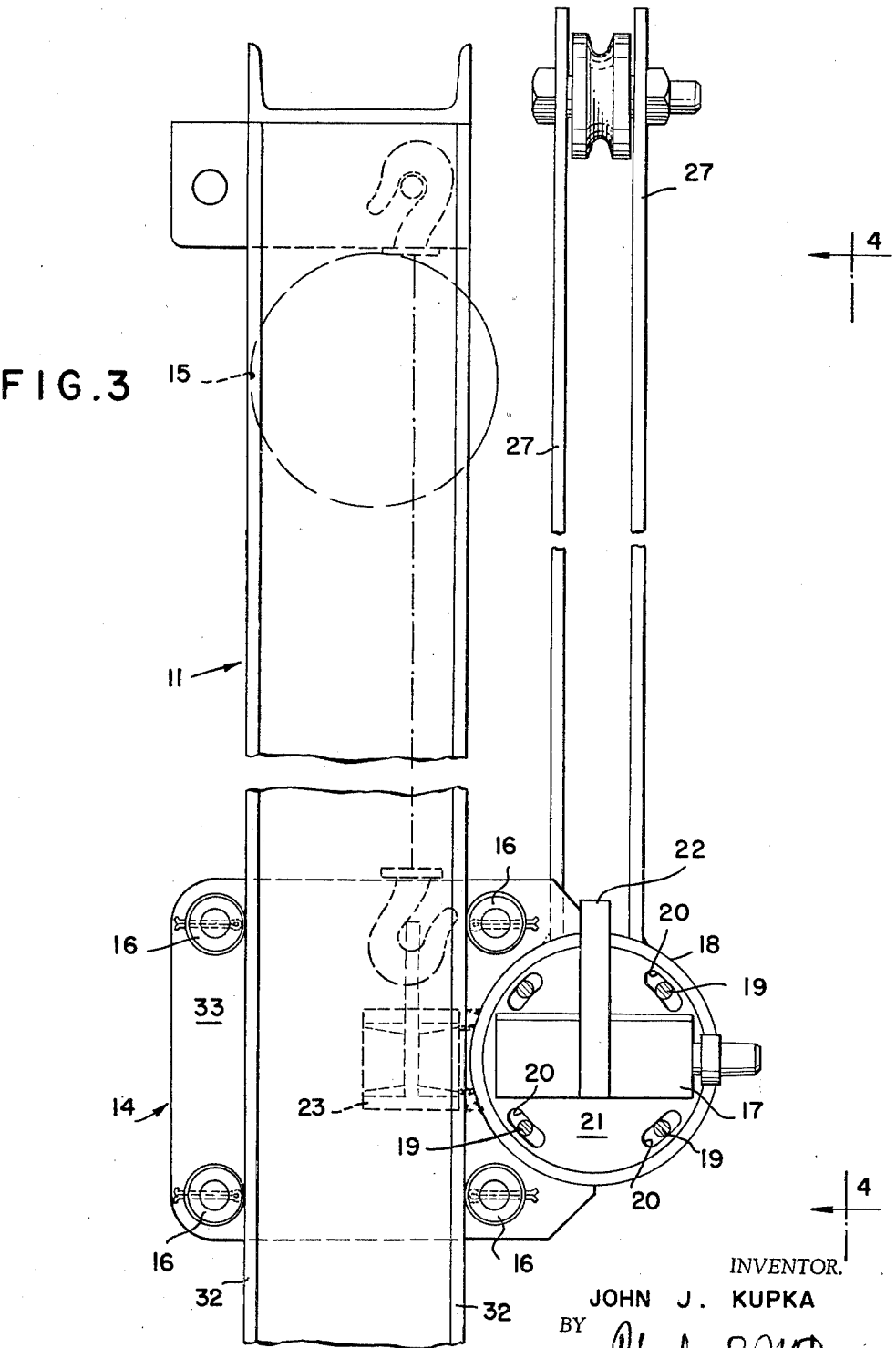
INVENTOR.
JOHN J. KUPKA
BY
ATTORNEY

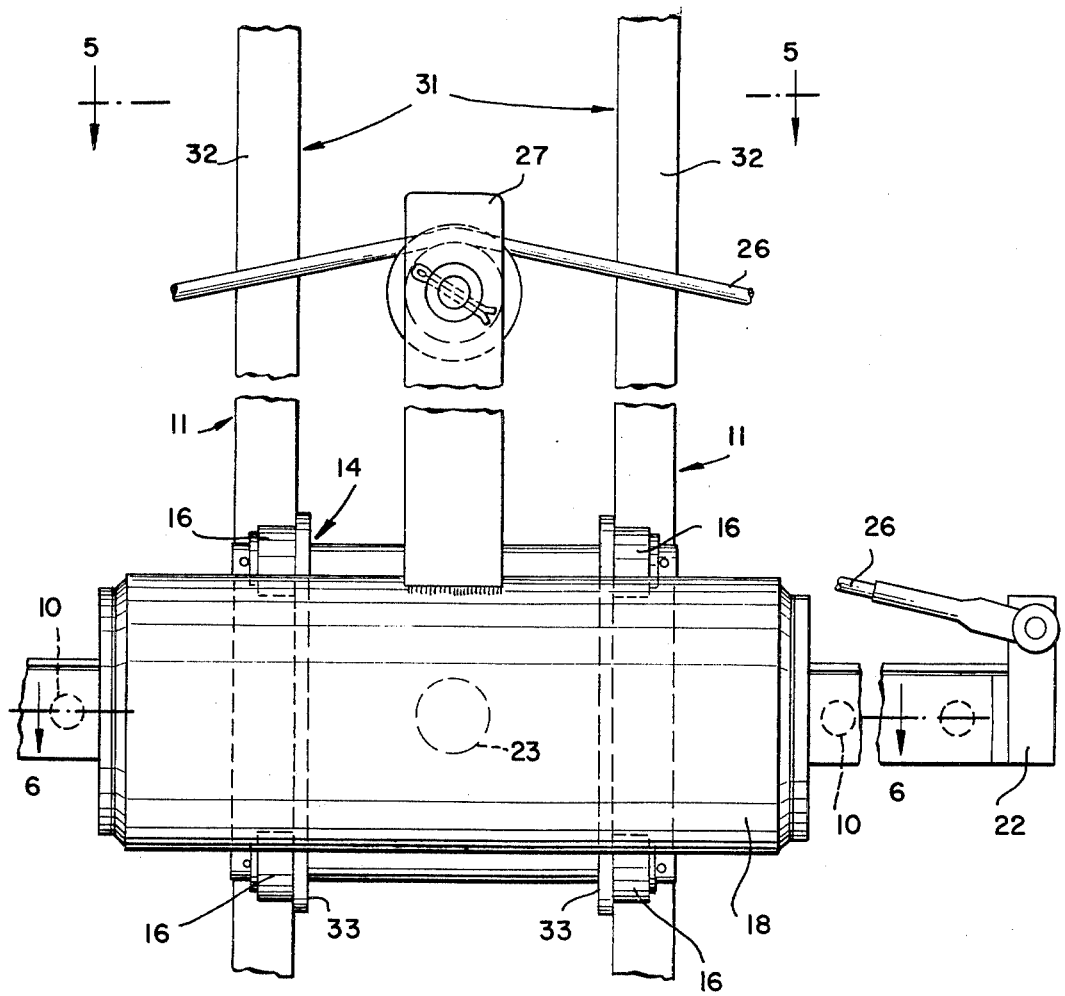

INVENTOR.
JOHN J. KUPKA
BY
ATTORNEY

March 17, 1970  J. J. KUPKA  3,500,900
THAWING OR REDUCING VISCOSITY OF FROZEN OR CONGEALED
CONTENTS OF RAILWAY CARS OR OTHER CONVEYANCES
Filed May 7, 1968  5 Sheets-Sheet 5

INVENTOR.
JOHN J. KUPKA
BY
*Philip S. McLean*
ATTORNEY

United States Patent Office 3,500,900
Patented Mar. 17, 1970

3,500,900
THAWING OR REDUCING VISCOSITY OF FROZEN OR CONGEALED CONTENTS OF RAILWAY CARS OR OTHER CONVEYANCES
John J. Kupka, Gladstone, N.J., assignor to KHG Associates, Merrick, N.Y., a partnership
Filed May 7, 1968, Ser. No. 732,798
Int. Cl. F24h 3/00
U.S. Cl. 165—47                                5 Claims

ABSTRACT OF THE DISCLOSURE

Superheated compressed air is used to thaw frozen loads of coal, iron ore, limestone and the like, or to liquify viscous fluids which have become congealed in tank cars or other carriers.

Discretion and mobility are thus attained without the hazards of fire or other loss and the heat may be conserved by carrying out these operations in a tunnel-like enclosure through which the conveyances may be passed.

---

Objects of this invention have been to free such more or less frozen loads, expeditiously and economically, without injury to cars or contents and with simple, practical equipment presently available for furnishing necessary heating medium.

Other desirable objects accomplished by the invention and further novel features of construction, combination and relation of parts constituting the invention are set forth and will appear in the course of the following specification.

The drawings accompanying and forming part of this specification illustrate presently preferred embodiments of the invention, but structure may be modified and changed as regards this illustration all within the true intent and scope of the invention as hereinafter defined and claimed.

FIG. 1 is a side elevation of the system as in use thawing contents of an ordinary railway car.

FIG. 2 is an end view showing heat transmitting nozzles disposed to apply heat at different levels at opposite sides of the car.

FIG. 3 is an enlarged broken detail of the vertically adjustable nozzle carrying head at one side of the car.

FIG. 4 is a front elevation of the same.

Figure 5:
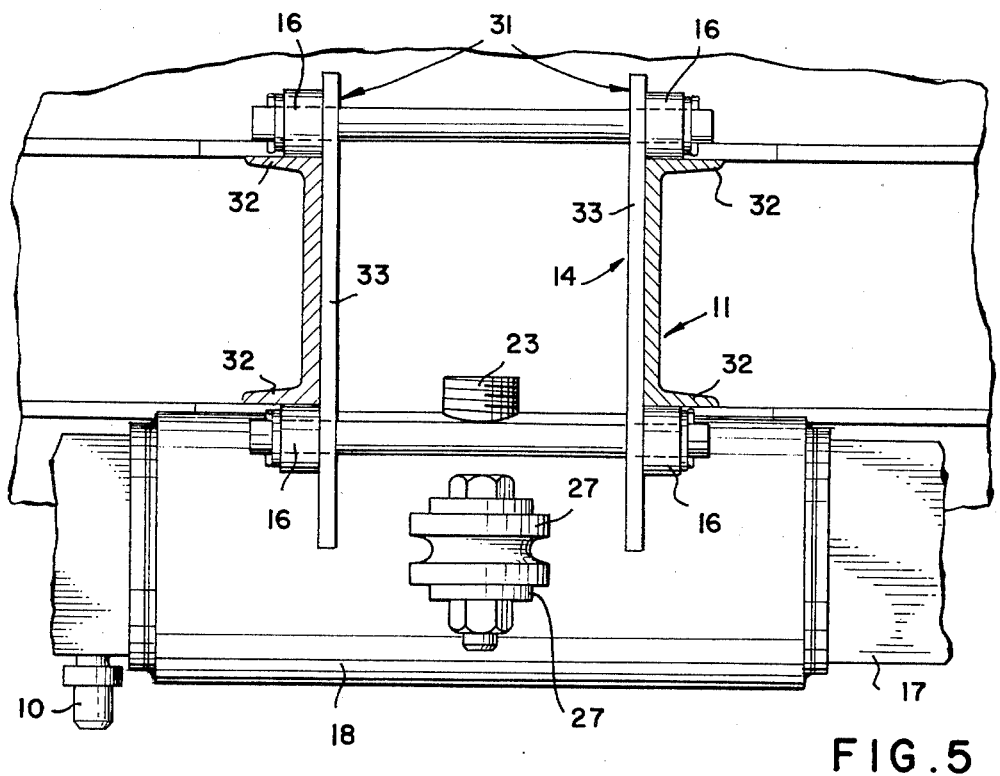
FIG. 5 is a broken sectional top plan view of the nozzle head.

In FIGS. 1 and 2, the invention is illustrated as comprising nozzles 10 for delivering superheated compressed air, mounted on posts 11, at the opposite sides of a trackway 12, carrying the loaded cars 13 to be treated.

The nozzles 10 project toward and into close proximity to the sides of the car and are shown mounted on carriages 14, shiftable vertically on the posts so as to effectively reach all portions of the car contents.

The means for adjusting the nozzle elevation is shown here in FIG. 3 as chain hoists 15, suspended from the tops of the columns and connected with the nozzle carriages; the latter directed on the columns by guide rolls 16.

To reach the full length of the cars, the nozzles are grouped in rows, as indicated in FIG. 1, carried by manifolds 17 extending in opposite directions from a central supply header 18, FIG. 5, forming part of the movable carriage 14.

To enable limited vertical adjustment of the nozzle direction, the nozzle carrying manifolds are shown as attached to opposite ends of the supply header 18 by bolts 19, FIG. 3, extending through segmental slots 20 in flanges 21 at the ends of the manifolds.

Figure 6:
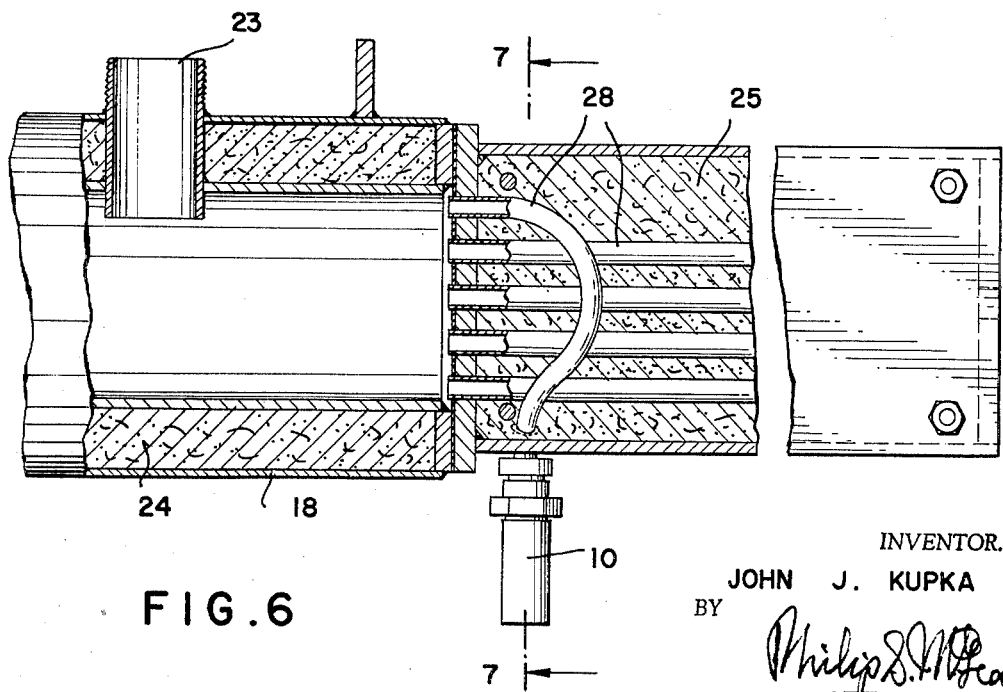
FIG. 6 is a horizontal sectional view of the latter on substantially the plane of line 6—6 of FIG. 4.

The headers 18 are shown in FIGS. 3, 5 and 6, as having supply connections 23 at the outer sides of the same for engagement by hose or other supply connections from the source of superheated compressed air.

Figure 7:
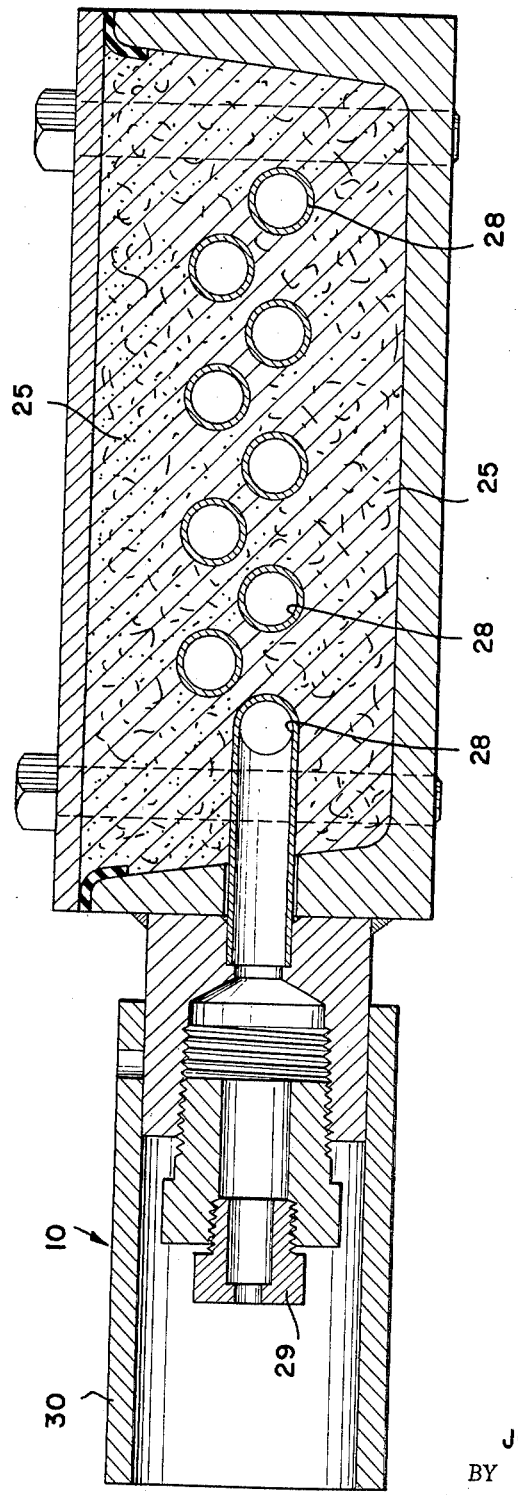
FIG. 7 is a further enlarged broken sectional view of the nozzle structure as taken on substantially the plane of line 7—7 of FIG. 6.

As shown particularly in FIGS. 6 and 7, the headers and manifolds are packed with suitable thermal insulation 24, 25.

The manifolds may be of considerable length, to reach the full length of the car, and so they are shown as supported and braced against sagging by cables 26 extending from opposite ends at 22 of the manifolds up over supports 27 projected up from the nozzle carriages.

As shown in FIGS. 6 and 7, separate leads 28 are extended from the supply headers to the respective nozzles.

FIG. 7 shows the nozzles of special construction, having sized discharge orifices 29, enclosed in heat confining and shielding shrouds or screens 30.

The columns 11 are shown in FIGS. 3, 4 and 5 as of special design, made up of laterally spaced channels 31, with flanges 32 faced outwardly to carry the rolls 16, with the side plates 33 slidingly guided over the inner faces of the channels.

The oppositely extending manifolds are readily detachable from the supporting header, enabling the substitution of different length manifolds for different car lengths and the like.

A continuous supply of superheated compressed air is provided in the present invention by the air heating compressor of Patent No. 3,148,507, of Sept. 15, 1964, which may be connected by insulated hose direct with the supplying connections 23 of the nozzle headers.

Other sources of superheated compressed air may be employed, providing compressed air usually about 100 p.s.i. at a discharge temperature between 400 and 500 degrees F. at a temperature below the flash point of compressor oil.

Utilizing the portable superheating air compressor of the patent mentioned, this thawing system may be operated in the open air wherever trackage for the cars is available.

To avoid weather conditions and conserve heat energy, it may be preferred to operate the system in a shed or enclosed tunnel structure and the invention contemplates and includes such a combination.

The latter may be preferred as including a greater or more exact degree of control and quicker results.

Also the thawing time and action may be made more or less automatic, as by sending the loaded cars in a specified time or rate of movement through an enclosing shed or tunnel structure.

The invention is adapted to the thawing treatment of all kinds of materials, solids and fluids as well.

Different kinds of nozzles may be substituted to meet different requirements.

The form of nozzle illustrated is at present generally preferred, the surrounding heat shield about the orifice, confining the superheated compressed air to the subject treated and preventing inflow of cooler air in back of the nozzle.

The elongated nozzle manifolds are supported at the center, and braced at the ends by cantilever connections, forming simple sturdy constructions which do not take up much room at the sides of the cars.

In operating on different materials it may be found desirable to direct the blasts of superheated compressed air more or less directly into the body of the material.

This can be accomplished in the case illustrated by raising the manifolds above the tops of the cars and turning them to direct the nozzles downwardly into the body of the material.

This has the further advantage of utilizing the heat and mechanical force of the air flow to dry and loosen and break up adherent discrete material.

What is claimed is:

1. Thawing system for railway cars and other conveyances comprising the combination of
    a row of superheated compressed air delivery nozzles,
    a manifold supporting said row of nozzles,
    means for supporting said manifold with said delivery nozzles in position for directing a flow of superheated compressed air into a body of material carried by a railway car,
    means for supplying superheated compressed air to said manifold.

2. The invention according to claim 1 with said means for supporting said manifold including means for effecting vertical and angular adjustment of said manifold to vary the level and the angle of direction of said nozzles.

3. The invention according to claim 1 in which said nozzles are shielded against inflow of cooling air in back of the same.

4. The invention according to claim 1 in which said manifold is in two longitudinally extending sections connected to the opposite ends of an intermediate supply header.

5. The invention according to claim 1 in which said supporting means includes upright channel beams in laterally spaced back-to-back relation with edge flanges of the channel beams exposed, and
    a carriage slidingly received between said back-to-back beams and having rollers riding the flanges of said beams.

References Cited

UNITED STATES PATENTS

| 2,165,615 | 7/1939 | Cope | 98—2 |
| 3,151,197 | 9/1964 | Schultz | 239—184 |

OTHER REFERENCES

Article on page 59 of Engineering & Mining Journal of August 1949.

ROBERT A. O'LEARY, Primary Examiner

C. SUKALO, Assistant Examiner

U.S. Cl. X.R.

98—2; 214—44; 239—184